(12) United States Patent
Bösl et al.

(10) Patent No.: US 12,133,057 B2
(45) Date of Patent: Oct. 29, 2024

(54) EQUIPMENT PART FOR A VEHICLE WITH AUDIO UPHOLSTERY DEVICE AND METHOD FOR MANUFACTURING AN EQUIPMENT PART WITH AUDIO UPHOLSTERY DEVICE

(71) Applicant: GRAMMER AG, Ursensollen (DE)

(72) Inventors: Manuel Bösl, Freudenberg (DE); Hubert Keller, Weiherhammer (DE)

(73) Assignee: GRAMMER AG, Ursensollen (DE)

( * ) Notice: Subject to any disclaimer, the term of this patent is extended or adjusted under 35 U.S.C. 154(b) by 170 days.

(21) Appl. No.: 17/873,492

(22) Filed: Jul. 26, 2022

(65) Prior Publication Data

US 2023/0033250 A1    Feb. 2, 2023

(30) Foreign Application Priority Data

Jul. 30, 2021    (DE) .................... 10 2021 119 904.2

(51) Int. Cl.
| | | |
|---|---|---|
| *H04R 5/02* | (2006.01) |
| *B60N 2/28* | (2006.01) |
| *B60N 2/879* | (2018.01) |
| *H04R 1/02* | (2006.01) |
| *H04R 1/40* | (2006.01) |

(52) U.S. Cl.
CPC ........... *H04R 5/023* (2013.01); *B60N 2/2851* (2013.01); *B60N 2/879* (2018.02); *H04R 1/025* (2013.01); *H04R 1/403* (2013.01)

(58) Field of Classification Search
CPC ...... B60N 2/879; B60N 2/2851; H04R 5/023; H04R 1/025; H04R 1/403; H04R 2499/13; H04R 1/023; H04R 7/16; H04R 9/04; H04R 1/347; H04R 1/2873; H04R 9/043; H04R 2207/021; H04R 7/14; H04R 2307/025; H04R 2307/201; H04R 7/20; H04R 9/06
See application file for complete search history.

(56) References Cited

U.S. PATENT DOCUMENTS

| | | | |
|---|---|---|---|
| 2005/0053252 A1* | 3/2005 | Cohen | H04R 5/023 381/301 |
| 2017/0072869 A1* | 3/2017 | Ito | H04R 5/023 |

(Continued)

FOREIGN PATENT DOCUMENTS

| | | |
|---|---|---|
| DE | 19840444 A1 | 5/1999 |
| DE | 102016200531 A1 | 7/2017 |

(Continued)

*Primary Examiner* — Carolyn R Edwards
*Assistant Examiner* — Julie X Dang
(74) *Attorney, Agent, or Firm* — LUCAS & MERCANTI, LLP; Klaus P. Stoffel

(57) ABSTRACT

The invention relates, inter alia, to an equipment part for a vehicle, including a base, at least one first foam layer and a covering, wherein the equipment part is provided with at least one audio cushion device which has at least one loudspeaker device having at least one loudspeaker, wherein each loudspeaker has a sound outlet. The first foam layer has an opening which extends along a center axis of the sound outlet such that the sound can continue through the opening in the direction toward the covering. A sound-permeable carrier layer covers the opening and in the direction of the sound propagation behind the carrier layer a second foam layer is arranged which engages over the opening.

13 Claims, 3 Drawing Sheets

(56) References Cited

U.S. PATENT DOCUMENTS

2019/0379956 A1 12/2019 Subat
2019/0394571 A1* 12/2019 Matsumoto .......... B60N 2/5858

FOREIGN PATENT DOCUMENTS

| DE | 202021105667 U1 | 12/2021 |
| DE | 102021204590 A1 | 3/2022 |
| FR | 2768100 A1 | 3/1999 |
| GB | 2595318 A | 11/2021 |

* cited by examiner

EQUIPMENT PART FOR A VEHICLE WITH AUDIO UPHOLSTERY DEVICE AND METHOD FOR MANUFACTURING AN EQUIPMENT PART WITH AUDIO UPHOLSTERY DEVICE

CROSS-REFERENCE TO RELATED APPLICATIONS

The present application which claims priority of DE 10 2021 119 904.2, filed Jul. 30, 2021, the priority of the application is hereby claimed and this application is incorporated herein by reference.

BACKGROUND OF THE INVENTION

According to a first aspect, the invention relates to an equipment part for a vehicle having an audio cushion device. Such an equipment part is e.g. a headrest, an armrest or a center console.

A headrest has e.g. main body which can be fastened by means of a holding device to the structure of a seat back of a vehicle seat. In a so-called integral seat, the main body is non-releasably connected to the structure of the seat back. The main body is provided with a foam which can be formed from a foam part mounted on the main body. The foam is provided with a covering which can be formed e.g. from textile or leather. In the prior art, loudspeakers have already been integrated into such a headrest.

From DE 198 40 444 A1, for example, a headrest is known which has a front side with a central region which is suitable for serving as a support for the head of the seat occupant, and which is framed by two loudspeakers which are set flush into this front side.

A disadvantage of this prior art is that, to avoid damage to the loudspeaker, the outlet openings of the loudspeakers where covered with a grille which, as a protection against damage, prevented access to the loudspeaker. For this reason, the region of the headrest, which was provided with the grille, could not be used as a bearing surface. Furthermore, the grille constitutes a risk of injury for example in the event of an accident. This prior art was also disadvantageous in terms of visual appearance, because it restricted the design freedom.

SUMMARY OF THE INVENTION

The object of the invention was that of creating a vehicle equipment part which is provided with a loudspeaker, wherein however a bearing against all cushion regions is possible and is also improved in view of safety aspects. Furthermore, the vehicle equipment part was to be improved in view of visual appearance.

The equipment part is intended for a vehicle, wherein the vehicle can be a land, air or water vehicle.

The equipment part comprises a base. The base can be made e.g. from a plastic part or a sheet metal part. More particularly, the base is formed of a headbox of a headrest or at least one wing fastened thereto.

The equipment part has at least one loudspeaker device, wherein each loudspeaker device is provided with at least one loudspeaker, which each comprise a sound outlet. The loudspeaker device is e.g. held on the base part or alternatively is held by a foam. The fastening of the loudspeaker device is effected e.g. in that a sound outlet of the at least one loudspeaker is directed to the cushion side, more particularly to the occupant of the vehicle seat. The sound outlet side projects beyond the base e.g. merely with a low height.

The base is provided with at least one first foam layer. The first foam layer is provided with a covering which covers the first foam layer. The first foam layer is intended to provide an elastically deformable bearing for the vehicle occupant so that said person—in the event that the equipment part is e.g. a headrest—is cushioned in the event of an impact on the equipment part. The first foam layer can e.g. by formed of a foam part which is pulled onto the base part or e.g. alternatively produced using the in-situ method, wherein the base part is inserted in a mold and the first foam layer is foamed onto the base part.

In front of the sound outlet, an opening in the first foam layer extends in a direction parallel to a center axis of the sound propagation. In front of each sound outlet, an opening is formed in the first foam layer. The opening is provided for an unimpeded passage of the sound so that the sound is not absorbed by the first sound layer.

A sound-permeable carrier layer is arranged at least partially covering the opening. This carrier layer has e.g. a high strength so that it does not tear if the seat occupant rests against or leans on the vehicle equipment part in the region of the loudspeaker. The carrier layer has the function of preventing access to the loudspeaker and thus protects the loudspeaker from being damaged. It also has a supporting function. In this way—as described in more detail below— the covering is prevented from being pushed into the opening as a result of a seat occupant resting against the part, and the opening cannot be felt by the seat occupant.

In the direction of the sound expansion behind the carrier layer, e.g. a fabric, a second foam layer is arranged which covers the opening. This foam layer is sound-permeable and in the region of the opening provides the comfort of an elastically deformable bearing of the seat occupant. The fabric supports the second foam layer so that it cannot be pressed into the opening. The seat occupant therefore feels no difference between the region of the cushion which comprises the opening and a cushion region of the equipment part bordering the opening. Nevertheless, the sound waves can pass through the region of the opening effectively due to the sound-permeable fabric and the sound-permeable second foam layer.

The first foam layer, the second foam layer and the carrier layer are made e.g. from parts.

To prevent the covering from also absorbing the sound of the loudspeaker device in the region of the opening, the covering is designed such that the sound can pass through the covering.

An advantage of the claimed combination of features of claim 1 is that the equipment part comprises at least one loudspeaker device having at least one loudspeaker, this however being hidden from the seat occupant in the cushion without any sacrificing of comfort. The seat occupant can rest against or lean on the cushion and does not risk becoming injured by the loudspeaker. Furthermore, there is no risk of the loudspeaker being destroyed as a result of a bearing of the seat occupant and a deformation of the cushion caused thereby. The opening, which is provided in the first cushion layer for an unimpeded sound expansion, also cannot be felt by the seat occupant. In addition, the design of the vehicle equipment part is not disrupted by the loudspeaker opening.

Within the meaning of the invention, sound-permeable means that the sound emitted from the loudspeaker can pass through the sound-permeable material in a substantially loss-free manner.

The carrier layer is e.g. formed of a fabric and/or a grille. The fabric has e.g. a high strength.

The carrier layer is arranged relative to the first foam layer such that it at least partially covers the opening for the sound propagation. The cover layer e.g. completely covers the opening.

For example, the cover layer is fastened to the first foam layer. Fastening can be effected e.g. by gluing or by means of other suitable fastening methods.

For example, the sound-permeable carrier layer is foamed into the first foam layer. In this manner, no special fastening of the carrier layer is necessary. The carrier layer is e.g. during the creation of the first foam layer arranged in the mold in such a manner that it spans over the opening.

A diameter of the opening is e.g. greater than a diameter of the sound outlet. In this case, the diameter is constant. The form of sound propagation is taken into consideration in that the opening has a diameter that is greater than the diameter of the sound outlet. According to an alternative, the diameter of the opening increases as the distance from the sound outlet increases.

The second foam layer is e.g. fastened to the first foam layer. The second foam layer is e.g. glued or welded to the first foam layer.

The second foam layer is e.g. arranged such that an outer surface of the first foam layer and an outer surface of the second foam layer are flush. The transition between the first foam layer and the second foam layer then cannot be identified or felt by the seat occupant.

Regions of the second foam layer are e.g. fastened in a seat of the first foam layer. The seat is formed e.g. by a recess in the first foam layer. If the second foam layer is formed of a foam part, e.g. peripheral regions of the foam part can be inserted in the seat, more particularly in the recess, wherein other regions of the foam part cover the opening. The fastening can be effected e.g. by means of gluing in. Alternatively, however, every suitable fastening method can be used to connect the first foam layer and the second foam layer.

The covering is formed e.g. of a textile, leather or artificial leather. A textile has the advantage that it can be formed of a sound-permeable material. The textile is e.g. completely sound-permeable or has a sound-permeable insert in the region of the opening. In the case of leather or artificial leather, the sound permeability is e.g. achieved in that openings are formed in the covering, and therefore the sound can pass through the openings.

The first foam layer is e.g. formed of a polyurethane foam. Polyurethane foam is usually used for the cushion of vehicle equipment parts.

The equipment part is e.g. formed by a vehicle seat, a headrest or a center console.

According to a second aspect, the invention relates to a method for producing an equipment part for a vehicle having an audio cushion device.

Such a method is known from public prior use. In wings of a headrest, loudspeakers were set in a recess of the cushion, which have a cover which engages over a peripheral region of the recess.

The object of the invention is that of creating a method for producing an audio cushion device, wherein a bearing against all cushion regions is possible and is also improved from a safety point of view. Furthermore, in the method, design aspects of the headrest should not be adversely affected by parts of the loudspeaker device, such as e.g. loudspeaker grilles.

The equipment part is provided for a vehicle, wherein the vehicle can be a land, air or water vehicle.

The equipment part comprises a base which e.g. can be formed of at least one plastic part, a composite component or a metal part. On the base, a first foam layer is arranged such that in front of a sound outlet of each loudspeaker of at least one loudspeaker device of the equipment part, an opening is located in the first foam layer, which extends along a center axis of the sound propagation.

A sound-permeable carrier layer is arranged such that it covers the opening. The carrier layer can e.g. be fastened to the first foam layer or foamed into the first foam layer.

For example, gluing can be used to fasten the carrier layer.

In a direction parallel to the center axis of the sound propagation behind the carrier layer, a second foam layer is arranged such that it covers the opening. It can e.g. be arranged such that an outer surface of the first foam layer is flush with an outer side of the second foam layer.

The first foam layer and the second foam layer are provided with a covering.

With regard to the advantages of the invention, reference is made to the first aspect of the invention.

An exemplary embodiment of the invention is described by way of example in the description of the drawings below, also with reference to the schematic drawings. For the sake of clarity—including insofar as different embodiments are concerned—identical or comparable parts or elements or regions are labeled with the same reference characters, sometimes with the addition of lower-case letters.

Within the framework of the invention, features that are described, shown or disclosed only in relation to one exemplary embodiment can also be provided for every other exemplary embodiment of the invention. Modified exemplary embodiments of this kind are covered by the invention, even if they are not shown in the drawings.

All disclosed features are per se essential to the invention. In the disclosure of the application, the disclosed content of the cited documents and of the described devices of the prior art is also disclosed in full, also for the purpose of including individual or multiple features of the subject-matters disclosed there in one or more claims of the present application. Such modified exemplary embodiments are also covered by the invention, even if they are not shown in the drawings.

BRIEF DESCRIPTION OF THE DRAWING

Shown are in.

DETAILED DESCRIPTION OF THE INVENTION

Figure 1:
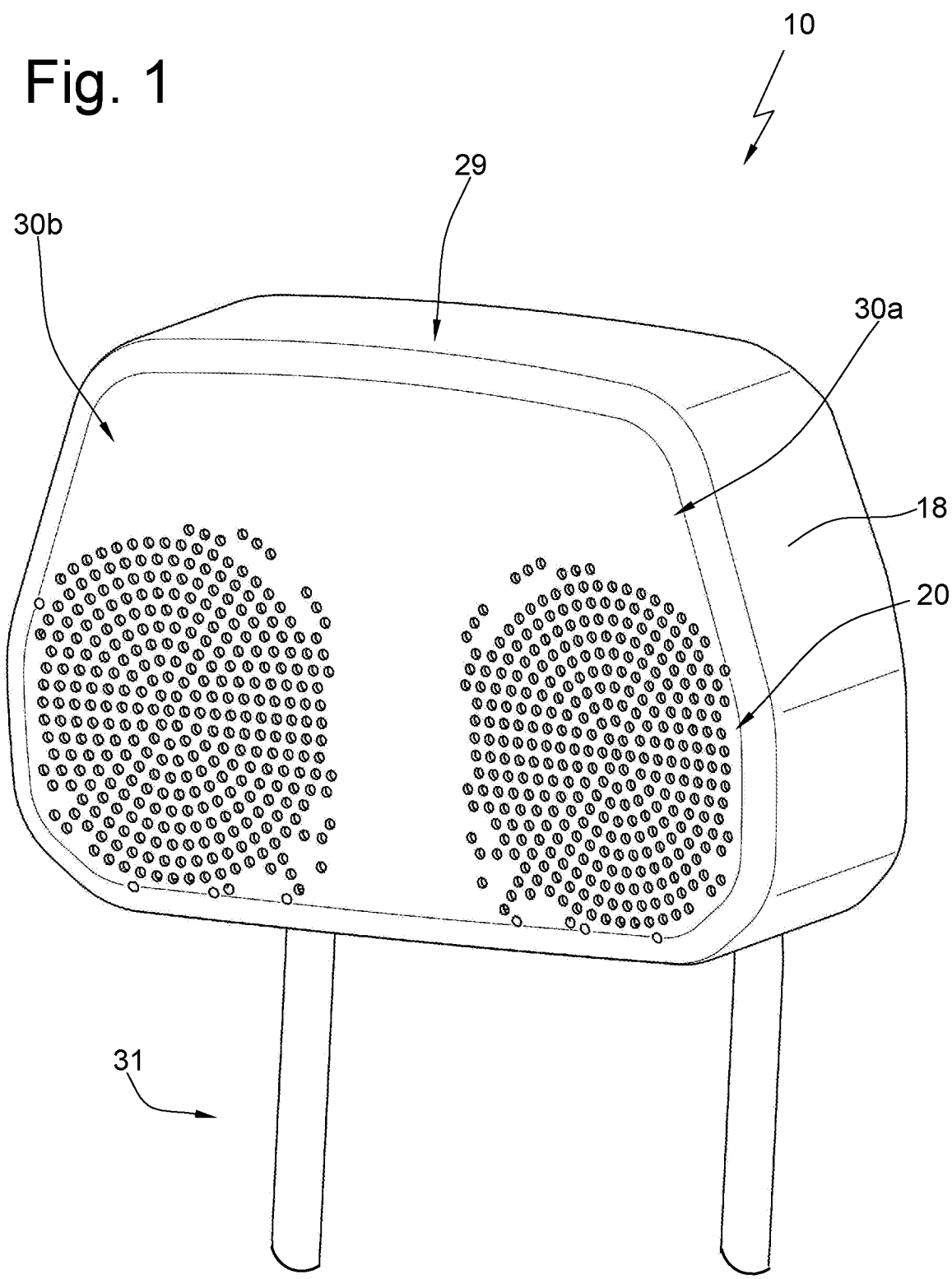
FIG. 1 a perspective view of an equipment part of a vehicle in the form of a headrest with audio cushion devices, FIG. 2 a sectional view of the vehicle equipment part according to FIG. 1 with integrated loudspeaker, FIG. 3 an exploded view of the vehicle equipment part according to FIG. 2

FIG. 1 shows an equipment part 10. In the present exemplary embodiment, the equipment part 10 is a headrest for a vehicle seat. However, the equipment part could alternatively e.g. also be a vehicle seat, more particularly a seat back. In so-called integral seats, the headrest is integrated in the seat back of the vehicle seat. The invention can also be used here.

The equipment part comprises a head part 29 and a holding device 31. The head part is provided with two audio cushion devices 30a and 30b (see FIG. 1). Since the two audio cushion devices 30a and 30b have in principle the same structure, only the audio cushion device 30a will be described in more detail hereinafter.

Figure 2:
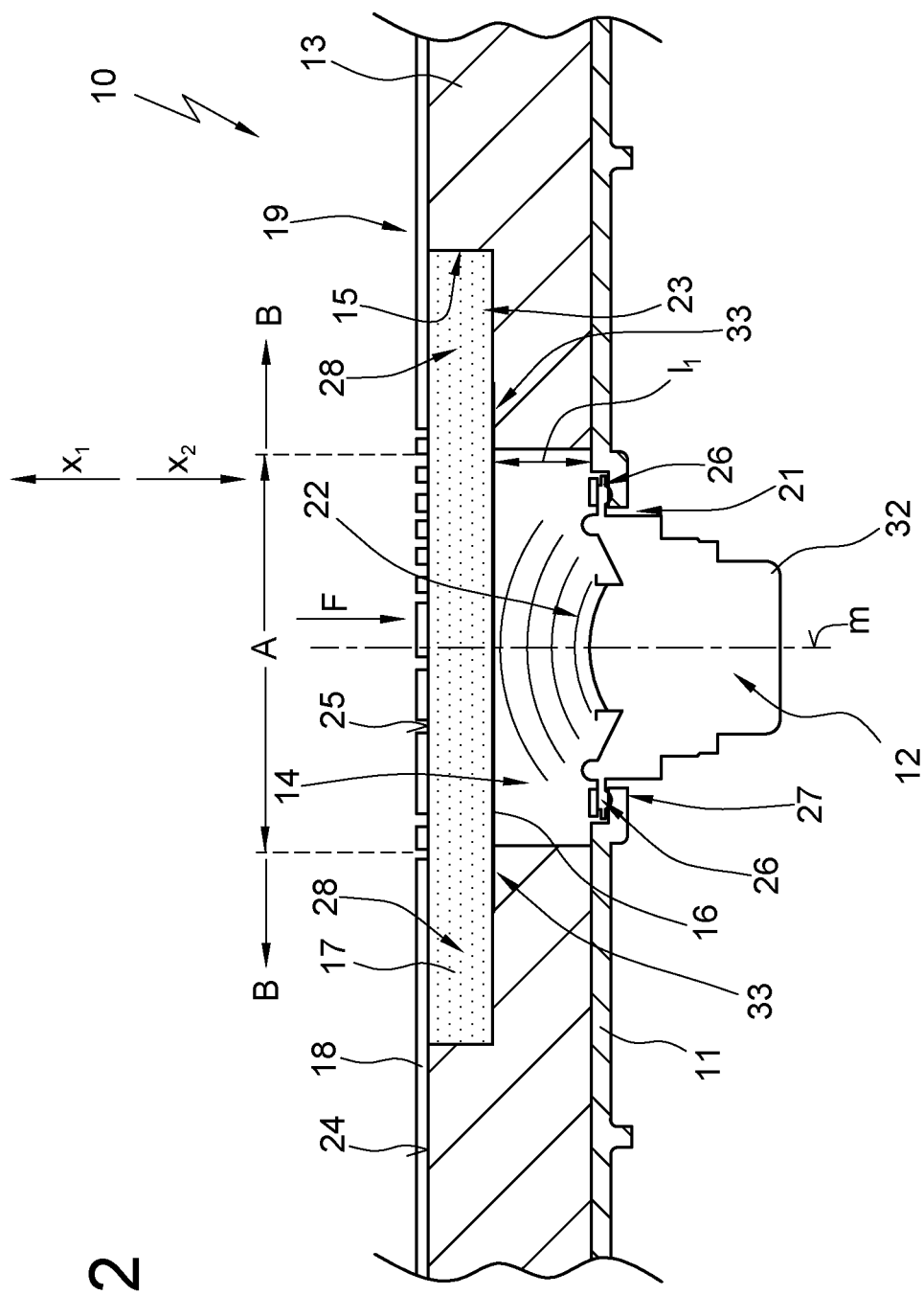
Figure 3:
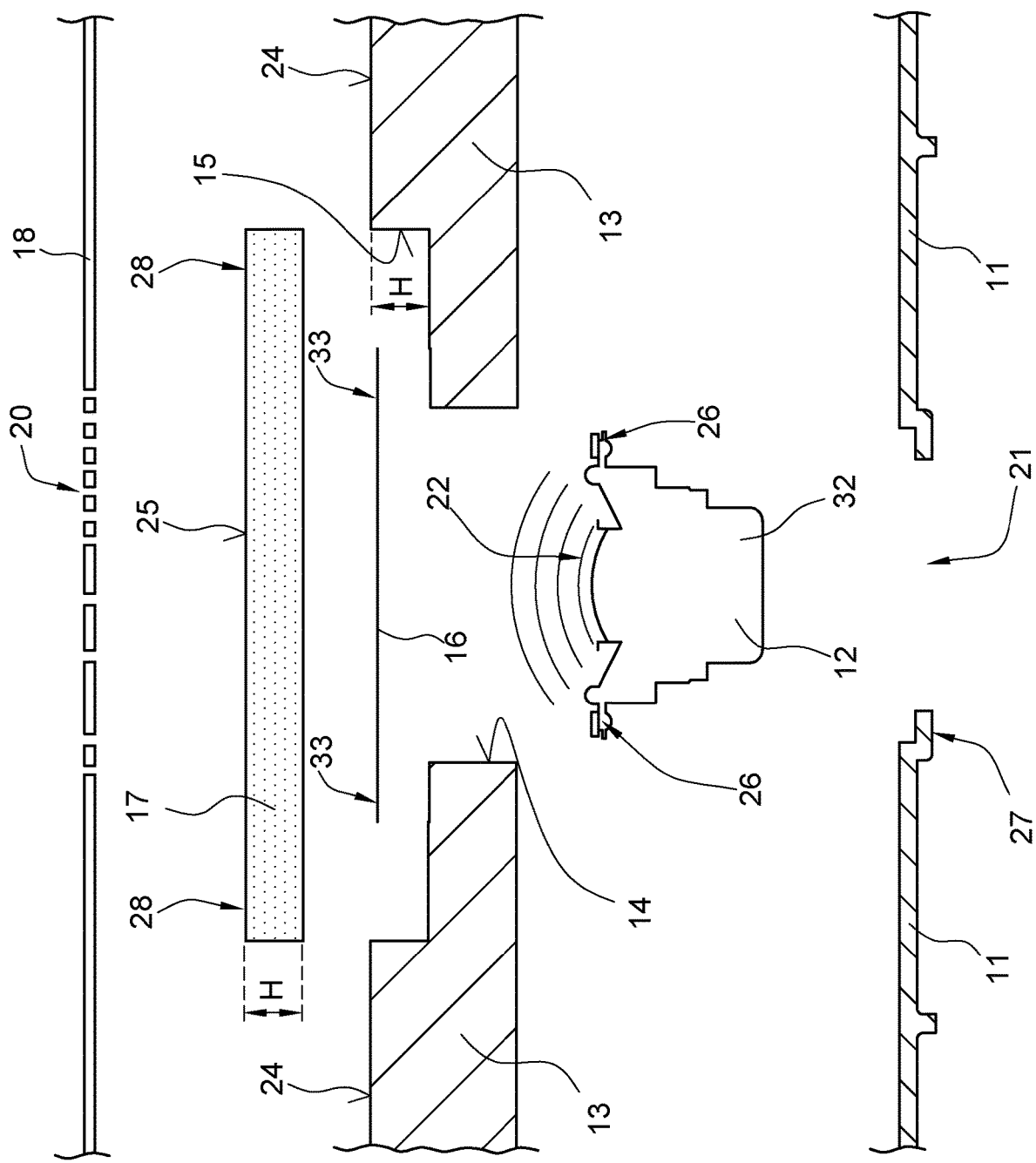

The audio cushion device 30a comprises, according to FIGS. 2 and 3, a base 11, a first foam layer 13 and a covering 18, wherein the first foam layer 13 and the covering 18 are part of a cushion 19. The base 11 can e.g. be formed from a plastic carrier fastened on the seat back structure or alternatively (not shown) e.g. from wings of the headrest supported on the plastic carrier.

In the present example, a loudspeaker device 12 is fastened to the base 11, which loudspeaker device has here, for the sake of more simple explanation, merely one loudspeaker 32, but could however alternatively have a plurality of loudspeakers 32.

For fastening the loudspeaker device 12, the base 11 has, in the present exemplary embodiment, a recess 21, wherein the loudspeaker device 12 is fastened to the peripheral region of the recess. However, the loudspeaker device 12 could alternatively be arranged differently. The fastening of the loudspeaker device does not matter here.

The loudspeaker device 12 is arranged such that a center axis m of a sound outlet 22 of the loudspeaker 22 is oriented parallel to the direction x1. The first foam layer 13 is provided with an opening 14 so that the sound of the loudspeaker 32 can propagate unimpeded in direction x1 and the first foam layer 13 does not impair the propagation of the sound in direction x1.

Since the sound is not propagated parallel to the direction x1, and is rather propagated in an opening angle to said direction, a diameter of the opening 14 is e.g. greater than a diameter of the sound outlet or is alternatively designed conically such that the diameter of the opening increases as the distance in direction x1 from the sound outlet increases.

At a distance l1—measured from the sound outlet—transverse to the center axis m, the opening 14 is engaged over by a sound-permeable carrier layer 16, which in this example is held on the first foam layer 13. In the present example, peripheral regions of the carrier layer 16 are foamed into the first foam layer 13 for fastening. Alternatively, however, other fastening methods are conceivable, such as e.g. a glued fastening.

In the event of a force F acting on the covering in a direction x2, the carrier layer 16 prevents a deformation of the covering 18 which could damage the loudspeaker 12. Because the carrier layer 16 is fastened to the first foam layer 13, a force needed to deform the first foam layer 13 counteracts the force F. The length l1 is dimensioned accordingly for a defined force F.

Furthermore, the carrier layer 16, in the present example a fabric, can contribute to a seat occupant not feeling the opening 14 when said seat occupant rests against the covering 18. This is discussed in more detail below.

A second foam layer 17 is arranged behind the carrier layer 16 in direction x1 of the sound propagation. The sound-permeable second foam layer 17 also covers the opening 14 and extends transverse to the center axis m. In the region of the opening 14, holding means are formed to hold the second foam layer 17. The second foam layer 17 is fastened to the first foam layer 13 here.

In the present exemplary embodiment, for fastening the second foam layer 17, which is here formed of a foam part, the first foam layer 13 is provided with a recess 15 in which peripheral regions 28 of the second foam layer 17 are arranged and e.g. glued.

In this manner, in the region A of the opening 14, the same comfort of an elastically deformable bearing as in the regions B of the cushion 18 to the side of the opening 14 is ensured by means of the elastically deformable second foam layer 17. The seat occupant can thus also rest against or lean on the cushion 19 in the region A of the opening 14 without perceiving a difference in comfort between the region B to the side of the opening and region A of the opening 14.

The carrier layer 16 prevents the second foam layer from being pushed into the opening 14 in direction x2. Nevertheless, the sound can exit the cushion 19 in direction x1 because it can pass practically unimpeded through the opening 14, the carrier layer 16, the second foam layer 17 and the covering 18.

The entire covering 18 or a region of the covering 18 covering the opening 14 is e.g. formed of a sound-permeable textile. In the latter case, the sound-permeable region covers the opening 14. If the covering 18 is formed of a less sound-permeable material, such as e.g. leather or artificial leather, perforations 20 can be provided in the covering 18. If the covering 18 is formed of a sound-permeable material, such perforations 20 are not necessary.

The equipment part 10 is assembled in that firstly, fastening arms 26 of the loudspeaker device 12 are fastened to a peripheral region 27 of the opening 21. The first foam layer 13 is arranged such that the opening 14 is located in front of the sound outlet 22. The first foam layer 13 is e.g. formed of a prefabricated foam part which was previously produced.

For example the first foam layer 13 already comprises the sound-permeable carrier layer 16, wherein peripheral regions 33 of the carrier layer 16 were foamed in during production of the first foam layer 13, i.e. there is a permanent connection between the first foam layer 13 and the carrier layer 16. Alternatively, the carrier layer 16 is fastened to the first foam layer 13 e.g. by means of a glued connection such that the carrier layer 16 covers the opening 16.

On the first foam layer 13, means 23 are formed which serve to fasten a second foam layer 17. In this exemplary embodiment, the means 23 are formed by a recess 15 in the first foam layer 13. In terms of a height H, the recess 15 and the second foam layer 17 are dimensioned such that an outer surface 24 of the first foam layer 13 and an outer surface 25 of the second foam layer 17 are flush when the first foam layer 13 is fastened in the recess 15.

Peripheral regions 28 of the second foam layer 17 are inserted in the recess 15 of the first foam layer 13 and fastened thereto.

The second foam layer 17 offers the comfort of an elastic deformation under the action of a force F, but has the property that it has better sound permeability with respect to the first foam layer 13.

Then, the equipment part 10 is provided with the covering 18. This is formed e.g. with a high sound permeability overall or alternatively the covering is provided with a region having a higher sound permeability in relation to the other regions. In the latter case, the covering is arranged such that the region having higher sound permeability covers the opening 14.

If a covering 18 having a lower sound permeability is chosen, such as e.g. a leather covering, perforations 20 are e.g. introduced into the covering 18 before the covering 18 is installed.

The invention claimed is:

1. An equipment part for a vehicle, comprising: a base; at least one first foam layer; a covering; at least one audio cushion device that has at least one loudspeaker device having at least one loudspeaker with a sound outlet, wherein the first foam layer has an opening that extends along a center axis of the sound outlet so that the sound passes through the opening in a direction toward the covering; a sound-permeable carrier layer covering the opening; and a second foam layer that engages over the opening is arranged behind the carrier layer in a direction of sound propagation, wherein the carrier layer is foamed into the first foam layer.

2. The equipment part according to claim 1, wherein the carrier layer is formed from a fabric and/or a grille.

3. The equipment part according to claim 1, wherein the carrier layer is fastened to the first foam layer.

4. The equipment part according to claim 1, wherein the opening has a diameter that is larger than a diameter of the sound outlet, or that the diameter of the opening increases as the distance from the sound outlet of the loudspeaker increases.

5. The equipment part according to claim 1, wherein the opening has a diameter that increases as distance from the sound outlet of the loudspeaker increases.

6. An equipment part for a vehicle, comprising: a base; at least one first foam layer; a covering; at least one audio cushion device that has at least one loudspeaker device having at least one loudspeaker with a sound outlet, wherein the first foam layer has an opening that extends along a center axis of the sound outlet so that the sound passes through the opening in a direction toward the covering; a sound-permeable carrier layer covering the opening; and a second foam layer that engages over the opening is arranged behind the carrier layer in a direction of sound propagation, wherein the second foam layer is fastened to the first foam layer.

7. An equipment part for a vehicle, comprising: a base; at least one first foam layer; a covering; at least one audio cushion device that has at least one loudspeaker device having at least one loudspeaker with a sound outlet, wherein the first foam layer has an opening that extends along a center axis of the sound outlet so that the sound passes through the opening in a direction toward the covering; a sound-permeable carrier layer covering the opening; and a second foam layer that engages over the opening is arranged behind the carrier layer in a direction of sound propagation, wherein the second foam layer is arranged on the first foam layer so that an outer surface of the first foam layer and an outer surface of the second foam layer are flush to one another.

8. An equipment part for a vehicle, comprising: a base; at least one first foam layer; a covering; at least one audio cushion device that has at least one loudspeaker device having at least one loudspeaker with a sound outlet, wherein the first foam layer has an opening that extends along a center axis of the sound outlet so that the sound passes through the opening in a direction toward the covering; a sound-permeable carrier layer covering the opening; and a second foam layer that engages over the opening is arranged behind the carrier layer in a direction of sound propagation, wherein regions of the second foam layer are arranged in a recess in the first foam layer.

9. The equipment part according to claim 1, wherein the covering is leather, artificial leather or a textile.

10. The equipment part according to claim 1, wherein the covering is made completely or in regions from a sound-permeable textile.

11. The equipment part according to claim 1, wherein the first foam layer is a polyurethane foam.

12. The equipment part according to claim 1, wherein the equipment part is the headrest or part of a vehicle seat.

13. A method for producing an equipment part for a vehicle having an audio cushion device, comprising the steps of: providing a base; forming at least one first foam layer on the base so that an opening is formed in the first foam layer in a region of a sound outlet of at least one loudspeaker of at least one loudspeaker device of the equipment part; arranging a carrier layer to cover the opening; arranging a second foam layer behind the carrier layer in a direction of sound propagation so that the second foam layer covers the opening; and providing the first foam layer and the second foam layer with a covering, further including foaming the carrier layer into the first foam layer.

* * * * *